United States Patent
Wen et al.

(10) Patent No.: US 8,194,288 B2
(45) Date of Patent: Jun. 5, 2012

(54) ADJUSTING THE NEUTRAL BEHAVIOR OF A COLOR MARKING DEVICE

(75) Inventors: Zhenhuan Wen, Pittsford, NY (US); Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 435 days.

(21) Appl. No.: 12/429,397

(22) Filed: Apr. 24, 2009

(65) Prior Publication Data

US 2010/0271665 A1 Oct. 28, 2010

(51) Int. Cl.
*H04N 1/40* (2006.01)

(52) U.S. Cl. ....... 358/3.23; 358/3.01; 358/1.9; 358/515; 358/518; 358/529; 382/162; 382/167

(58) Field of Classification Search ................... 358/3.23
See application file for complete search history.

(56) References Cited

U.S. PATENT DOCUMENTS

| | | | |
|---|---|---|---|
| 6,686,953 B1 * | 2/2004 | Holmes | 348/179 |
| 6,731,796 B2 | 5/2004 | Maltz et al. | |
| 2009/0174909 A1 * | 7/2009 | Li et al. | 358/3.27 |

* cited by examiner

*Primary Examiner* — Twyler Haskins
*Assistant Examiner* — Brendan McCommas
(74) *Attorney, Agent, or Firm* — Philip E. Blair; Fleit Gibbons Gutman Bongini & Bianco P.L.

(57) ABSTRACT

What is disclosed is a novel system and method for adjusting the gray balance of a multifunction color marking device in order to change the device's neutral behavior to a desired level of acceptability. The gray balance aim curve is specified by: $L^*$, $L^*(aim)$, $a^*(aim)$ and $b^*(aim)$, where $L^*(aim)=f_1(L^*)$, $a^*(aim)=f_2(L^*)$, and $b^*(aim)=f_3(L^*)$. After receiving the user-modified gray balance aim curve, the target color device constructs a 3-D N×N×N $L^*a^*b^*$ to $L^*a^*b^*$ pre-LUT to reflect the neutral aim change by transforming a neutral axis input of $L^*$, $a^*=0$ and $b^*=0$ to $L^*(aim)$, $a^*(aim)$ and $b^*(aim)$. Colors further away from the neutral axis are shifted by a lesser amount. The pre-LUT is then concatenated with the current color LUT to produce an updated color LUT which is applied to the device to achieve the desired neutral behavior. The gray balance aim curve can also be based upon a pre-determined user preference.

8 Claims, 4 Drawing Sheets

ADJUSTING THE NEUTRAL BEHAVIOR OF A COLOR MARKING DEVICE

TECHNICAL FIELD

The present invention is directed to systems and methods for changing the neutral behavior of a color marking device to satisfy customer grey level preferences.

BACKGROUND

Grey (International usage) or Gray (primarily U.S. usage) describes various tints and shades in a range from Black to White, known as achromatic colors or neutral colors. In recent years, neutral colors had been reclassified to have low colorfulness and/or low chroma on a standard color wheel. Images which consist wholly of neutral colors are called monochrome, black-and-white, or grayscale images. The gray outputs of a color marking device are adjusted by a process called gray balancing. Gray balancing determines the output levels of each color of a color marking device needed to produce a neutral gray for color and grayscale images rendered or otherwise displayed on that device. This is based, in part, on a color profile of the device.

For many current color multi-function printing devices, gray balance along $L^*$ line is normally aim to $a^*=b^*=0$ under D50 or D65 illuminants which is defined by the International Commission on Illumination (CIE). However different customers have different gray balance preferences. For instance, some customers prefer warm neutral gray colors, while others prefer cold colors like metallic neutral color. Some customers claim the only gray balance preferred is black toner/ink color at a same $L^*$ under a same illuminant. Often, these user-preferred gray balance colors require that values for $a^*$ and $b^*$ are non-zero.

Accordingly, what is needed in this art are systems and methods for adjusting the neutral behavior of a color marking device to satisfy customer gray balance preferences in instances where values of $a^*$ and $b^*$ are not zero.

BRIEF SUMMARY

What is disclosed is a novel system and method for adjusting the gray balance of a color marking device to change the device's neutral behavior to a desired level of acceptability using a user-modified gray balance aim curve. The gray balance aim curve is specified with four columns, $L^*$, $L^*(aim)$, $a^*(aim)$ and $b^*(aim)$, where $L^*(aim)=f_1(L^*)$, $a^*(aim)=f_2(L^*)$, and $b^*(aim)=f_3(L^*)$. After receiving the user-modified gray balance aim curve, the target color device constructs a 3-D N×N×N $L^*a^*b^*$ to $L^*a^*b^*$ pre-LUT (lookup table) to reflect the neutral aim change by transforming a neutral axis input of $L^*$, $a^*=0$ and $b^*=0$ to $L^*(aim)$, $a^*(aim)$ and $b^*(aim)$. Colors further away from the neutral axis are shifted by a lesser amount. The shift function is Gaussian and falls to 1/e at a distance from the neutral axis equal to the range of the Gaussian. Upon a user acceptance, the color LUT of the target marking device is updated with the values of the pre-LUT by a concatenation of the pre-LUT with current LUT. The updated color LUT is then applied to the target color marking device to generate the desired changes in the device's neutral behavior. Unlike other approaches for adjusting grey colors, the present mapping method is constrained by the Gaussian such that only points along the neutral line and surrounding neighboring colors are affected. Other color points in the gamut are not affected.

Many features and advantages of the present system and method will become apparent from the following detailed description in conjunction with the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
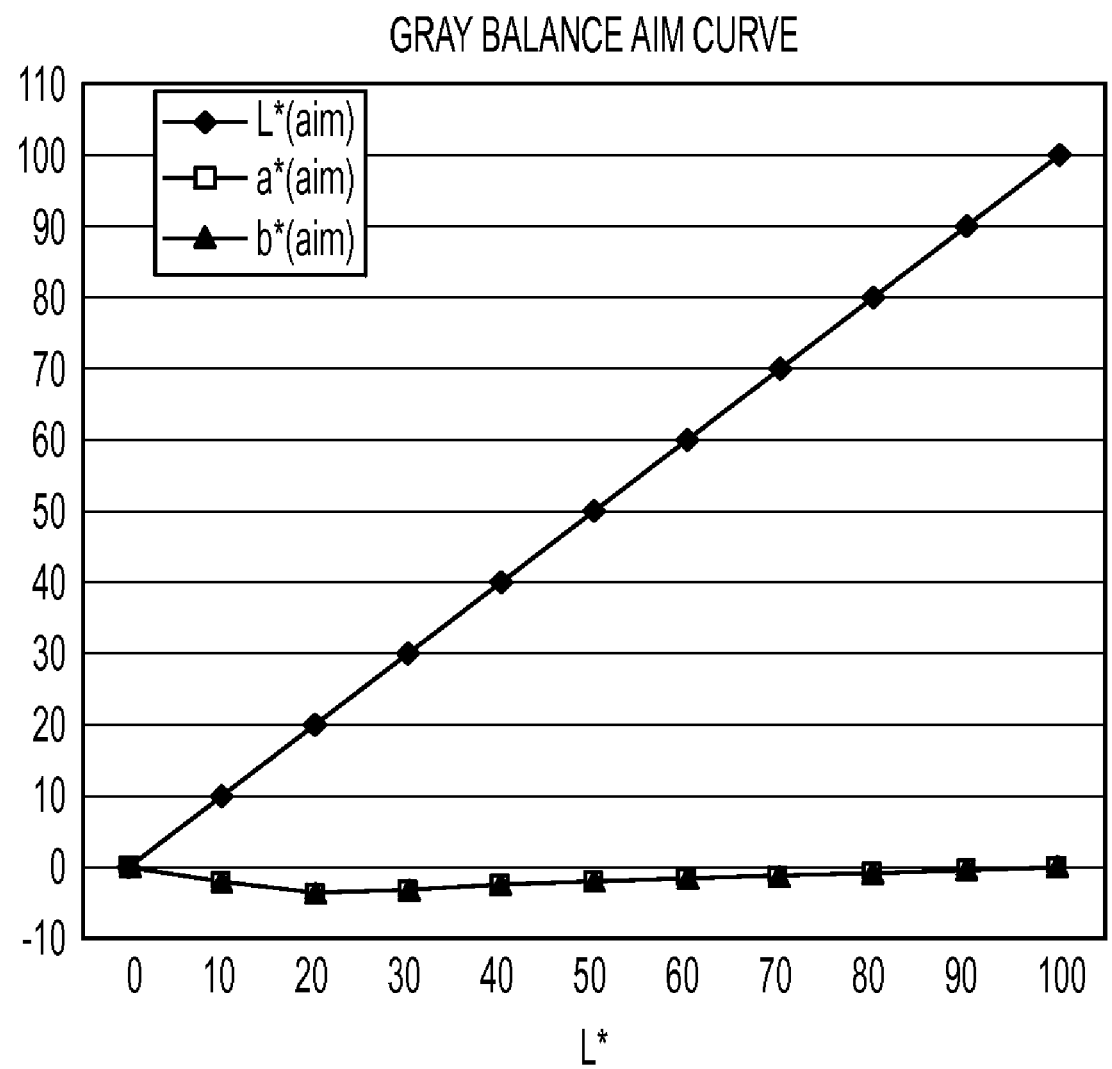
FIG. 1 shows an example gray balance aim curve for an example target color marking device.

What is presented is a method for adjusting the gray balance of a color marking device to change the device's neutral behavior.

As used herein, $L^*a^*b^*$ color space refers to a color-opponent space wherein dimension $L^*$ is luminance and $a^*$ and $b^*$ are the color-opponent dimensions based upon non-linearly compressed CIE XYZ (1931) color space coordinates. $L^*a^*b^*$ color space is more often used as an informal abbreviation for the CIE 1976 $L^*a^*b^*$ color space (also called CIELAB), whose coordinates are given by $\{L^*, a^*, b^*\}$. Chrominance ($a^*$) is the chrominance component of a first channel. Chrominance ($b^*$) is the chrominance component of a second channel. Luminance ($L^*$) is a photometric quantity which, in essence, is the effect of radiance on our eyes. Radiance is the physical quantity related to light intensity, i.e., the power of the light spreading out in some angle over an area. Luminance is the integration of radiance weighted with a curve which describes how efficiently different wavelengths of light trigger visual receptors in the eye. Brightness is the subjective visual experience of luminance, i.e., the visual effect of luminance on the brain. When referring to calorimetric or device independent spaces, the reference is to color space definitions that are transforms of CIE-XYZ space. When we refer to a device dependent space, we refer to a color space that is defined in terms of an operation of the device using it. While many color spaces have three dimensions, it is possible to have color spaces with less than three dimensions or more than three dimensions and likewise, it is possible for printers to use less than three colorants or more than four colorants.

A "color gamut" or "gamut" refers to a complete subset of colors as defined by the spectrum of light, i.e., the distribution of light energy versus wavelength, which can be accurately represented in a given circumstance, such as within a given color space or by a certain output device. The gamut of a color marking device, for example, is a multi-dimensional color space having a given volume with the axes of the color space being defined by pigments used in the colorants of the primary colors. Each of the primary colors is transferred by the image output device to a media. Primary colors for an additive device (like a monitor) are understood to be: Red (R), Green (G), Blue (B). Primary colors for a subtractive device (like a printer) are: Cyan (C), Magenta (M), Yellow (Y), and Black (K). One of ordinary skill would appreciate that gray balance makes it possible to remove a cast (or tint) from a specific color. The L* channel of the L*a*b* color space is a perceptually linear encoding of lightness on the scale from 0 to 100. In an 8-bit RGB space, RGB=(0, 0, 0) corresponds to L*=0 and RGB=(255, 255, 255) corresponds to L*=100. In practice, one does not have L*=0 or L*=100 when an image is printed on paper. L* cannot equal zero because paper reflects some incident light. Similarly, L* cannot equal 100 because paper does not reflect all incident light.

An "image", as used herein, refers to a spatial pattern of physical light comprised of known colors of the light spectrum which are visible by the human eye. When reduced to capture or rendering, the image generally comprises a plurality of colored pixels. A printed image (or image print) would be a photograph, plot, chart, and the like, as are generally known.

An "image output device" is any device capable of rendering an image. The set of image output devices includes multifunction devices, monitors and other displays, computer workstations and servers, and the like. An inkjet printer is one example color marking device which produces an image from a received signal of image data by the visual integration of color inks deposited onto a media substrate.

Gaussians are widely used in statistics where they appear as the density function of the normal distribution. A normal distribution, also called a Gaussian distribution, is a family of continuous probability distributions. Each member of the family may be defined by a pair of parameters: mean ("average", $\mu$), and variance (standard deviation squared, $\sigma^2$). A standard normal distribution is a normal distribution with a mean of zero and a variance of one. The normal distribution may also be parameterized using a precision parameter $\tau$, defined as the reciprocal of $\sigma^2$. This parameterization has an advantage in numerical applications where $\sigma^2$ is very close to zero and may be more convenient to work with as $\tau$ is a natural parameter of the normal distribution. The graph of a Gaussian is a characteristic symmetric bell-shaped curve that gradually tapers off to zero. A Gaussian has the general form:

$$f(x) = ae^{-\frac{(x-b)^2}{2\sigma^2}}, \quad (1)$$

where a is the height of the bell curve's peak, b, is the position of the center of the peak, c, controls the width of the bell, and e≈2.718281828 (Euler's number).

Reference is now being made to FIG. 1 which shows a graph of one example gray balance aim curve for an example target color marking device. FIG. 1 plots the following table of values for each of L*, a*, b*.

| L* | L*(aim) | a*(aim) | b*(aim) |
|---|---|---|---|
| 0 | 0 | 0 | 0 |
| 10 | 10 | −2.2 | −2.2 |
| 20 | 20 | −3.7091 | −3.7091 |
| 30 | 30 | −3.2364 | −3.2364 |
| 40 | 40 | −2.7818 | −2.7818 |
| 50 | 50 | −2.3091 | −2.3091 |
| 60 | 60 | −1.8545 | −1.8545 |
| 70 | 70 | −1.3818 | −1.3818 |
| 80 | 80 | −0.9091 | −0.9091 |
| 90 | 90 | −0.4545 | −0.4545 |
| 100 | 100 | 0 | 0 |

The gray balance aim curve, includes 3 curves (L*(aim), b*(aim) and a*(aim)), and shows an "aimed" neutral behavior of the target marking device. In general, the 3 aim curves (L*(aim), b*(aim) and a*(aim)) are functions of L* value along the neutral line, where a*=b*=0. A user can effectuate a change in a behavior of the target device by modifying the shape of any of the curves of FIG. 1 using a user interface.

Figure 2:
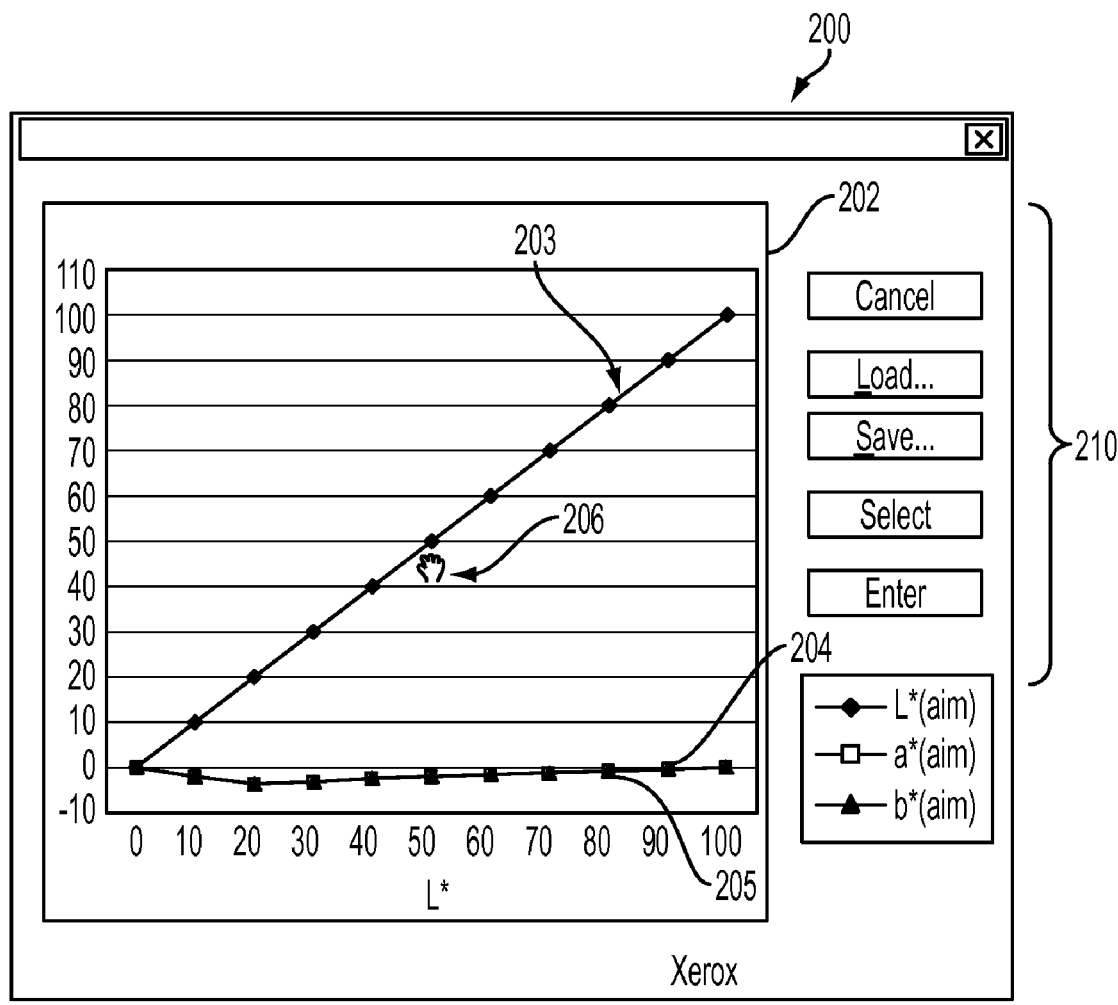
FIG. 2 shows one example user interface wherein a user modifies the shape of any of the curves of FIG. 1 to effectuate a desired change in the behavior of the target color device.

Reference is now being to FIG. 2 which shows one example user interface 200 wherein, through window 202, a user modifies the shape of any of the L*(aim), a*(aim), and b*(aim) curves of FIG. 1 (at 203, 204, and 205, respectively), using graphical widget 206 (shown as a "hand"). The user interface has a plurality of user-selectable buttons, collectively at 210. These buttons are intended to be illustrative and can be programmed to perform whatever operations the end user hereof desires for their particular image processing system. Other options may be added or these options may be removed. For example, an option can be provided wherein the user enters numerical values for one or more points along any of the curves to change the shape thereof. FIG. 2 shows that a user manipulates the shape of any of the curves of FIG. 1 through a physical manipulation thereof (drag and drop) using the graphical widget to change the shape of the gray balance aim curve to effectuate a desired change in the color marking device's behavior. The user interface is illustrative and only represents one embodiment of a software implementation.

Figure 3:
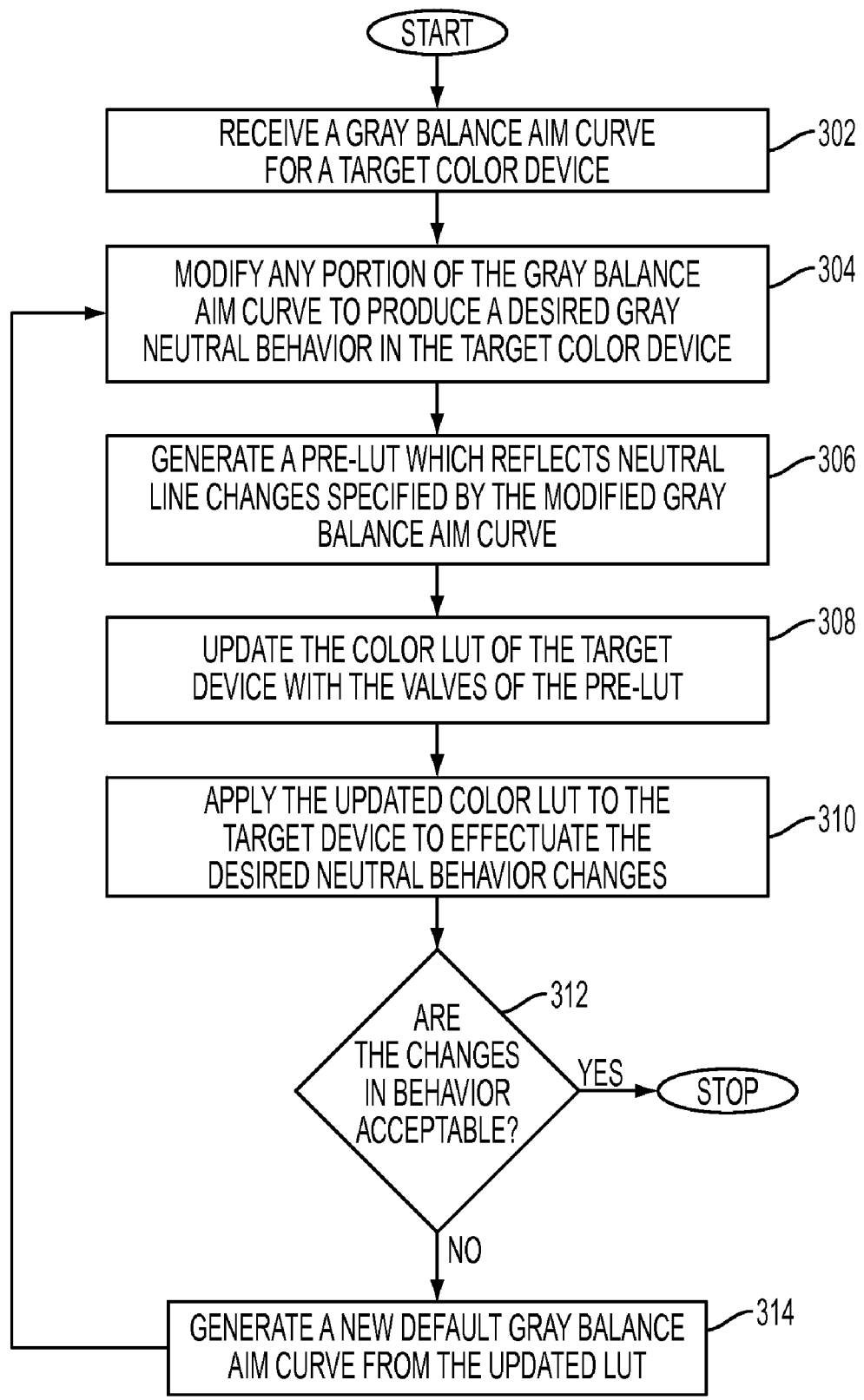
FIG. 3 shows a flow diagram of one example embodiment of the present method for changing the neutral behavior of a target color marking device.

Reference is now being made to the flow diagram of FIG. 3 which illustrates one example embodiment of the present method.

At 302, a gray balance aim curve specified in L*a*b* space of the color gamut of the target color marking device is received. The gray balance aim curve may be retrieved from a memory or from a remote device over a network. The gray balanced aim curve can be based upon customer preferences having been pre-loaded into the system. The gray balance aim curve includes 3 aim curves (L*(aim), b*(aim) and a*(aim)), which are functions of L* value along the neutral line, i.e., L*(aim)=$f_1$(L*), a*(aim)=$f_2$(L*), b*(aim)=$f_3$(L*).

At 304, the shape of the gray balance aim curve is modified in which L*(aim), b*(aim) and a*(aim) are a new function of L* value along the neutral line such as, for example, L*(aim) =$f_1$(L*), a*(aim)=$f_2$(L*), and b*(aim)=$f_3$(L*). In one embodiment, the user modifies the gray balance aim curve using the interface of FIG. 1.

Figure 4:
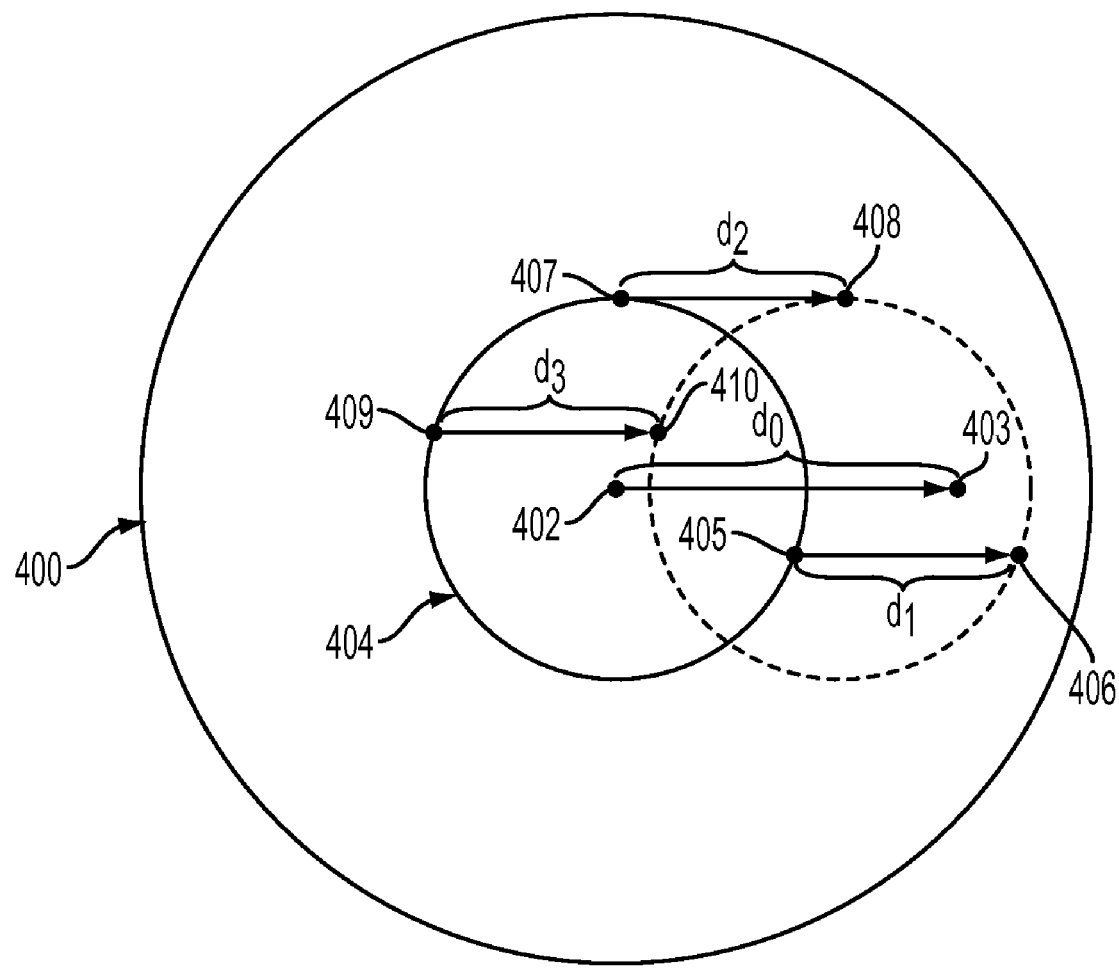
FIG. 4 shows how color points around a node are shifted according to a Gaussian wherein points farther away from the neutral line are shifted by a lesser amount.

At 306, a pre-LUT is generated which reflects the neutral line changes specified by the modified gray balance aim curve. After receiving the modified gray balance aim curve, the target color device first constructs a 3-D N×N×N L*a*b* to L*a*b* pre-LUT (Lookup Table) to reflect the neutral aim change by transforming a neutral axis input of L*, a*=0 and b*=0 to L*(aim), a*(aim) and b*(aim). Color points in the gamut in a neighborhood around the neutral line are shifted by a shift function. Color points further away from the neutral axis are shifted by a lesser amount than are color points closer to the neutral axis. The shift function is Gaussian and falls to 1/e at a distance from the neutral axis equal to the range. In FIG. 4, node 402 is a point along the neutral axis and, as a result of the user having modified the gray balance aim curve using, for instance, the interface of FIG. 2, this point is moved a distance $d_0$ to a new location 403. Color points in neighborhood 404 centered around point 402 are shifted to their respective new locations in the gamut 400. As shown, point 405 is shifted a distance $d_1$ to new location 406. Point 407 is shifted a distance $d_2$ to new location 408. Point 409 is shifted a distance $d_3$ to new location 410. Distances $d_3$, $d_2$ and $d_1$ are less than $d_0$. As a matter of fact, $d_1=d_2=d_3$ since their starting points are all equidistant from the neutral axis 402.

If the input value for a node in the lookup table is: $L^*=L$, $a^*=A$, and $b^*=B$, and the output value for the node is $L^*=L'$, $a^*=A'$, and $b^*=B'$, then:

$$L'=f_1'(L); \quad (2)$$

$$A'=A+f_2'(L)\cdot\exp(-(A^2+B^2)/\text{range}^2); \quad (3)$$

$$B'=B+f_3'(L)\cdot\exp(-(A^2+B^2)/\text{range}^2). \quad (4)$$

Note that the range must be set large enough to avoid color reversals. If $f_2'(L)$ or $f_3'(L)$ are large and the range is small, for inputs $A_1>A_2$, we may get outputs where $A_1<A_2$. To avoid this, set the range such that $$\text{range}>\max(f_2'(L),f_3'(L))\cdot\text{sqrt}(2)\cdot\exp(-0.5). \quad (5)$$

At 308, the color LUT of the target device is generated by a concatenation of the pre-LUT with the current LUT. In one embodiment, the original color LUT of the device is updated upon a user acceptance of the changes in the devices neutral behavior.

At 310, the updated color LUT is applied to the target color device to effectuate the desired changes in a neutral behavior of the device.

At 312, a determination is made whether the desired changes in the target color device's neutral behavior have achieved a desired level of acceptability to the user. If so, then processing stops as the neutral behavior of the target device has been effectively changed. If not, at 314, color values from the updated color LUT (from step 308) are used to produce a new gray balance aim curve and processing repeats with respect to step 304 wherein the user modifies the shape of the gray balance aim curve to the desired grey level.

One or more aspects of the present method may be carried out by a special purpose computer. Such a system could be implemented as a separate system, controller, circuit, ASIC, and the like, integrated with a document reproduction system. A special purpose computer includes a processor for executing machine readable instructions for carrying out the present method. The processor is in communication with a main memory which stores program instructions. A secondary memory may further be placed in communication with the processor. Such a secondary memory includes a hard disk or other storage device capable of reading/writing to a floppy disk, magnetic tape, optical disk, flash memory, memory stick, USB port, etc. The storage device is adapted to transfer of instructions and data to the processor. The system includes a communications interface which acts as both an input and an output to allow data to be transferred to external devices over a network. Example interfaces include a modem, network card, communications port, etc. Instructions transferred via the communications interface are in the form of signals. Such signal may be any of electronic, electromagnetic, optical, or other signals. These signals are provided to the communications interface via wire, cable, fiber optic, phone, cellular, RF, or other means known in the arts. The precise nature of the implementation of a special purpose computer will depend on the image processing environment wherein the present method finds its uses.

Various aspects of the present method may be placed on a computer readable storage medium capable of storing machine readable instructions which, when mounted on a computer system, cause the computer system to perform one or more aspects of the present method as described herein above. The machine readable instructions may be modified by one computer system and transferred to another computer system. One or more computer program instructions for carrying out the present method can be loaded on a computer-readable storage media which may include media such as optical disks (CD-ROM etc.), magnetic disks, magnetic cards, memories (including IC cards and memory card). The storage media stores the machine readable program instructions for sale, transport, and storage by changing magnetic, optical, and/or electric energy states in response to program description instructions having been transferred to the media. The storage medium can then be mounted on a computer system (or sub-system thereof) and transferred or otherwise communicated to another computer system. The program instructions can then be off-loaded to another program, in original form or modified, including data, and stored on a storage media of a storage device.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for providing instructions and/or data to the computer system or device for implementing the present method. The computer readable medium stores data, instructions, messages packets, or other machine readable information. The computer readable medium may include non-volatile memory, such as a floppy disk, hard drive, memory, ROM, RAM, flash memory, disk memory, and other permanent storage useful, for example, for transporting information such as data and machine readable program instructions. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer readable medium may additionally comprise information in a transitory state medium such as a network link or a network interface which may include a wired network or a wireless network which allows a computer to read such computer readable information.

It should be understood that the flow diagrams of the present method are illustrative. Other operations, for example, may be added, modified, enhanced, condensed, integrated, or consolidated. Variations thereof are intended to fall within the scope of the appended claims. One or more aspects of the present method are intended to be incorporated in an article of manufacture, including one or more computer program products. The article of manufacture may be included on at least one storage device readable by a machine architecture or other image processing system capable of executing machine readable program instructions. The article of manufacture may be included as part of a color management system, an operating system, a software program, or a plug-in. Such an article of manufacture may further be shipped, sold, leased, or otherwise provided separately either alone or as part of an add-on, update, upgrade, or product suite by the present assignee or a licensee thereof.

It will be appreciated that the above-disclosed features and functions and variations thereof may be desirably combined into many other different systems or applications. Various unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A computer implemented method for changing a neutral behavior of a color marking device, the method comprising:
   receiving a gray balance aim curve specified in L*a*b* space of a color gamut of a target color device, said gray balance aim curve being defined by three functions, L*(aim)=$f_1$(L*), a*(aim)=$f_2$(L*), and b*(aim)=$f_3$(L*), where, L*(aim), a*(aim) and b*(aim) are aimed curves for L*a*b* respectively, and L* is neutral axis input of L*;
   displaying said received gray balance aim curve on a user interface for a visual review by a user thereof;
   physically changing a shape of said gray balance aim curve in which L*(aim), b*(aim) and a*(aim) is a new function of L* along the neutral line to produce a desired neutral behavior in said target color device, said modifying said shape of said gray balance curve comprising a user using said user interface to perform any of: physically manipulating said neutral line and entering a new value for points along said neutral line, wherein a change in said shape of said gray balance aim curve is limited to a range>max($f_2'$(L*), $f_3'$(L*))×$\sqrt{2}$×exp(−0.5), where $f_2'$, and $f_3'$ are functions with respect to L* that define said modified gray balance curve, said range preventing color reversals;
   generating a pre-LUT reflecting neutral line changes specified by said modified gray balance aim curve, said pre-LUT being defined by a 3-D N×N×N L*a*b* to L*a*b* conversion lookup table which transforms a neutral axis input of L*, a*=0 and b*=0 to L*(aim), a*(aim) and b*(aim);
   updating a color LUT of said target color device with values of said pre-LUT to produce an updated color LUT for said device, said updated color LUT being generated by concatenating said pre-LUT with said color LUT.

2. The method of claim 1, wherein said shifting is according to a Gaussian function which falls to 1/e at a distance from the neutral axis equal to the range of the Gaussian.

3. The method of claim 1, wherein said gray balance aim curve is based upon a pre-determined user preference.

4. A system for changing a neutral behavior of a color marking device, the system comprising:
   a memory;
   a storage medium for storing data; and
   a processor in communication with said memory and said storage medium, said processor executing machine readable instructions for performing:
      receiving a gray balance aim curve specified in L*a*b* space of a color gamut of a target color device, said gray balance aim curve being defined by three functions, L*(aim)=$f_1$(L*), a*(aim)=$f_2$(L*), and b*(aim)=$f_3$(L*), where, L*(aim), a*(aim) and b*(aim) are aimed curves for L*a*b* respectively, and L* is neutral axis input of L*;
      displaying said received gray balance aim curve on a user interface for a visual review by a user thereof;
      physically changing a shape of said gray balance aim curve in which L*(aim), b*(aim) and a*(aim) is a new function of L* along the neutral line to produce a desired neutral behavior in said target color device, said modifying said shape of said gray balance curve comprising a user using said user interface to perform any of: physically manipulating said neutral line and entering a new value for points along said neutral line, wherein a change in said shape of said gray balance aim curve is limited to a range>max($f_2'$(L*), $f_3'$(L*))×$\sqrt{2}$×exp(−0.5), where $f_2'$, and $f_3'$ are functions with resect to L* that define said modified gray balance curve, said range preventing color reversals;
      generating a pre-LUT reflecting neutral line changes specified by said modified gray balance aim curve, said pre-LUT being defined by a 3-D N×N×N L*a*b* to L*a*b* conversion lookup table which transforms a neutral axis input of L*, a*=0 and b*=0 to L*(aim), a*(aim) and b*(aim);
      updating a color LUT of said target color device with values of said pre-LUT to produce an updated color LUT for said device, said updated color LUT being generated by concatenating said pre-LUT with said color LUT.

5. The system of claim 4, wherein said shifting is according to a Gaussian function which falls to 1/e at a distance from the neutral axis equal to the range of the Gaussian.

6. The system of claim 4, wherein said gray balance aim curve is based upon a pre-determined user preference.

7. A computer implemented method for changing a neutral behavior of a color marking device, the method comprising:
   receiving a gray balance aim curve specified in L*a*b* space of a color gamut of a target color device, said gray balance aim curve being defined by three functions, L*(aim)=$f_1$(L*), a*(aim)=$f_2$(L*), and b*(aim)=$f_3$(L*), where, L*(aim), a*(aim) and b*(aim) are aimed curves for L*a*b* respectively, and L* is neutral axis input of L*;
   displaying said received gray balance aim curve on a user interface for a visual review by a user thereof;
   physically changing a shape of said gray balance aim curve in which L*(aim), b*(aim) and a*(aim) is a new function of L* along the neutral line to produce a desired neutral behavior in said target color device, said modifying said shape of said gray balance curve comprising a user using said user interface to perform any of: physically manipulating said neutral line and entering a new value for points along said neutral line, wherein a change in said shape of said gray balance aim curve is limited to a range>max($f_2'$(L*), $f_3'$(L*))×$\sqrt{2}$×exp(−0.5), where $f_2'$, and $f_3'$ are functions with respect to L* that define said modified gray balance curve, said range preventing color reversals;
   generating a pre-LUT reflecting neutral line changes specified by said modified gray balance aim curve, said pre-LUT being defined by a 3-D N×N×N L*a*b* to L*a*b* conversion lookup table which transforms a neutral axis input of L*, a*=0 and b*=0 to L*(aim), a*(aim) and b*(aim);
   updating a color LUT of said target color device with values of said pre-LUT to produce an updated color LUT for said device, said updated color LUT being generated by concatenating said pre-LUT with said color LUT.

8. The method of claim 7, wherein said gray balance aim curve is based upon a pre-determined user preference.

* * * * *